US008803604B2

(12) United States Patent
Conti et al.

(10) Patent No.: US 8,803,604 B2
(45) Date of Patent: Aug. 12, 2014

(54) METHOD OF CONTROLLING AN ELECTROLUMINESCENT DISPLAY AND RELATED CONTROL CIRCUIT

(71) Applicant: STMicroelectronics S.R.L., Agrate Brianza (IT)

(72) Inventors: Giovanni Conti, Acireale (IT); Domenico Cristaudo, Tremestieri Etneo (IT); Stefano Corradi, Syracuse (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 11 days.

(21) Appl. No.: 13/758,031

(22) Filed: Feb. 4, 2013

(65) Prior Publication Data

US 2013/0207569 A1 Aug. 15, 2013

(30) Foreign Application Priority Data

Feb. 13, 2012 (IT) .............................. MI2012A0195

(51) Int. Cl.
*H03G 3/00* (2006.01)
(52) U.S. Cl.
USPC ............. 330/124 R; 330/69; 330/295; 330/9; 330/278
(58) Field of Classification Search
USPC ....... 330/124 R, 69, 295, 9, 20, 51, 278, 254, 330/280
See application file for complete search history.

(56) References Cited

U.S. PATENT DOCUMENTS

| 7,221,219 | B2 * | 5/2007 | Hellberg et al. | ........... 330/124 R |
| 7,301,395 | B2 * | 11/2007 | Mobbs | ....................... 330/124 R |
| 7,382,183 | B2 * | 6/2008 | Nolan et al. | ....................... 330/9 |
| 7,518,448 | B1 * | 4/2009 | Blair et al. | ................. 330/124 R |
| 2011/0141098 | A1 | 6/2011 | Yaguma et al. | |
| 2011/0187693 | A1 | 8/2011 | Chung | |

FOREIGN PATENT DOCUMENTS

JP 2006-251602 9/2006

* cited by examiner

*Primary Examiner* — Tuyet Thi Vo
(74) *Attorney, Agent, or Firm* — Allen, Dyer, Doppelt, Milbrath & Gilchrist, P.A.

(57) ABSTRACT

A control circuit is for generating upper and lower voltages that define a range of a data voltage for controlling a driving transistor of an electroluminescent component coupled to a supply line through the driving transistor. The control circuit may include a first input terminal configured to have a common voltage, and a pair of amplifiers coupled together at the first input terminal and configured to generate the upper voltage and the lower voltage to correspond to a difference between the common voltage and, respectively, first and second analog intermediate voltages representing respective threshold values of the upper voltage and of the lower voltage. The control circuit may include an auxiliary amplifier configured to adjust the upper voltage and the lower voltage based upon fluctuations of an input voltage, and generate the common voltage to correspond to the difference between the input voltage and a reference voltage.

24 Claims, 4 Drawing Sheets

METHOD OF CONTROLLING AN ELECTROLUMINESCENT DISPLAY AND RELATED CONTROL CIRCUIT

FIELD OF THE DISCLOSURE

The present disclosure relates to an electroluminescent display and, more specifically, to a control circuit of a driving transistor of an electroluminescent component and related methods.

BACKGROUND

Organic electroluminescent displays are light-emitting displays that are superior to displays that may require a separate light source, such as LCDs, in terms of motion picture characteristics, viewing angle and color reproduction. For these reasons, they are attracting much attention. They exploit the phenomenon of electroluminescence, in which differential energy is discharged as light when the electronic state of a material (typically an organic electroluminescent component) is changed from a ground state to an excited state by an electric field and the electronic state is returned from an unstable excited state to a stable ground state.

In general, an organic display device may comprise a plurality of singularly addressable electroluminescent components EL, each comprising a pixel of the image. FIG. 1 is a typical drive stage of an electroluminescent component EL that comprises a pixel of an electroluminescent display. Referring to FIG. 1, a driving transistor Ml is connected to the electroluminescent component EL to supply a current for emitting light. The current flowing throughout the driving transistor M1 is controlled by a data voltage applied through a switching transistor M2. The capacitor Cst connected between the gate of the transistor M1 and a voltage reference VSUS is used to precharge the gate of the transistor M1, thereby maintaining the applied voltage for a predetermined period of time. The gate of the transistor M2 is connected to a respective control line CTL1 and the current terminal of the transistor M2 is connected to a respective data line VDATA. The transistors M3 and M4 are controlled by respective control signals CTL2 and CTL3 for respectively discharging the control node of M1 and connecting/disconnecting the transistor M1 to the electroluminescent component EL.

When the control signal CTL1 turns on the transistor M2, a data voltage VDATA, that represents a desired intensity of light to be emitted, is applied to the gate of the driving transistor M1 via the data line. A current determined by the data voltage VDATA flows throughout the electroluminescent element EL, which emits light with an intensity corresponding to the data voltage VDATA. The data voltage VDATA may assume a value contained in a predetermined range of values VGMA_L, VGMA_H, that corresponds to the range of intensity of the emitted light.

FIG. 2 is a typical high level block diagram of a control device CONTROL that generates the voltages VGMA_L, VGMA_H, between which the data voltages VDATA may move. The block SOURCE DRIVER IC is a generator of data voltages VDATA that receives at least the extreme voltages VGMA_H and VGMA_L and also a command that represents a quantized level of the variation range defined by the extreme voltages, and outputs the data voltages VDATA on a data line to correspond to the quantized level.

Typically, the control circuit receives digital words DIGITAL representing the nominal values of the extreme voltages VGMA_H and VGMA_L to be generated. These digital words are converted into respective analog voltages VH and VL by respective digital-to-analog converters DAC, which use as a reference voltage Vref a voltage generated by a stable voltage generator VBG, for example, a band-gap voltage generator. The analog voltages VH and VL are amplified by respective amplifiers in cascade, referred to ground and supplied with a supply voltage AVDD, so that the extreme voltages VGMA_H and VGMA_L are determined in function of the analog voltages VH and VL by the following equations:

$$VGMA\_H=(1+(R2/R1))*VH, \text{ and}$$

$$VGMA\_L=(1+(R2/R1))*VL,$$

R2/R1 being the fixed gain of the amplifiers.

In theory, the voltage ELVDD' applied to the source of the driving transistor M1 should match a fixed supply voltage ELVDD supplied by a reference voltage generator. Because of losses along the relatively long electric path from the reference voltage generator to the current terminal of the driving transistor M1, as schematically represented in FIG. 3, the voltage ELVDD' effectively supplied to the electroluminescent component EL may significantly differ from the fixed supply voltage ELVDD. Therefore, when a same data voltage is generated for different electroluminescent components EL placed in different rows in order to generate light with the same intensities, the voltages ELVDD' applied to the driving transistors of the electroluminescent components EL may be different. Hence, a current of a different intensity flows throughout the electroluminescent components EL and thus they emit light with different intensities depending on their position in the array of the display, even if the supplied data voltages VDATA are the same. This undesirable effect may be particularly evident in high resolution AMOLED displays, that may absorb relatively great currents.

SUMMARY

It may be desirable to find a simple and reliable approach for this issue in a simple way without altering the quality of displayed images.

A method of controlling an electroluminescent display and a related control circuit that implements are disclosed herein. As in control circuits for controlling driving transistors of electroluminescent components, the extreme voltages VGMA_H and VGMA_L of the data voltages may be generated by amplifying the voltages representing the nominal values thereof using respective amplification circuits.

The control circuit may be capable of adjusting the upper voltage VGMA_H and the lower voltage VGMA_L to compensate fluctuations of the voltage ELVDD' effectively supplied to the driving transistors of the electroluminescent components because it is input with the voltage ELVDD' and has an auxiliary operational amplifier configured such to receive the voltage ELVDD' and a reference voltage and to generate the common voltage such to correspond to the difference between the voltage ELVDD' and the reference voltage.

If the control circuit may include a stable voltage generator, for example, for carrying out a digital-to-analog conversion of digital words representing the nominal values of the extreme voltages VGMA_H and VGMA_L, then the reference voltage may be conveniently the voltage generated by the stable voltage generator. According to yet another embodiment, the control circuit may receive the fixed supply voltage ELVDD and use it as the reference voltage for generating the common voltage of the amplification circuits.

DETAILED DESCRIPTION OF THE EMBODIMENTS

Figure 1:
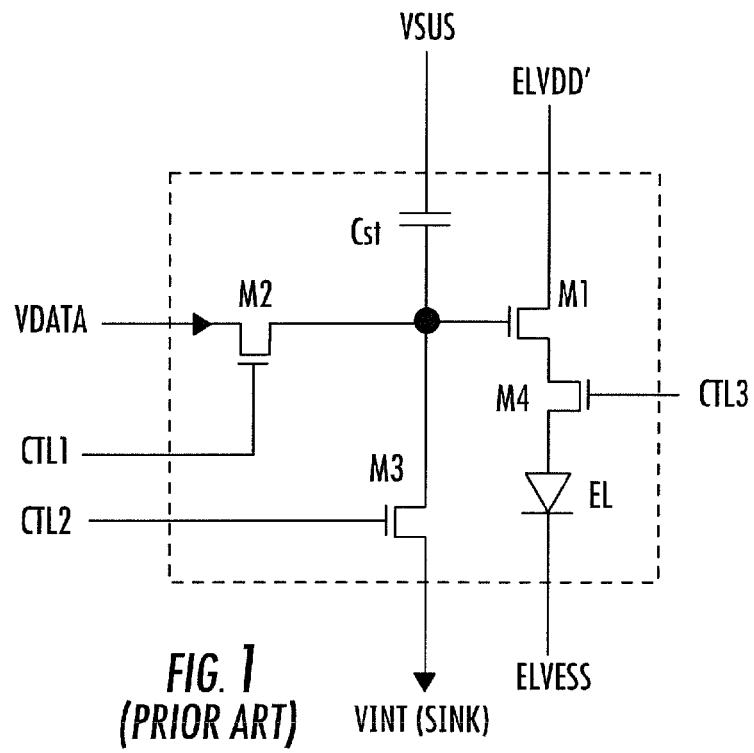
FIG. 1 is a schematic circuit diagram of a circuit of a pixel of a display device, according to the prior art.
Figure 3:
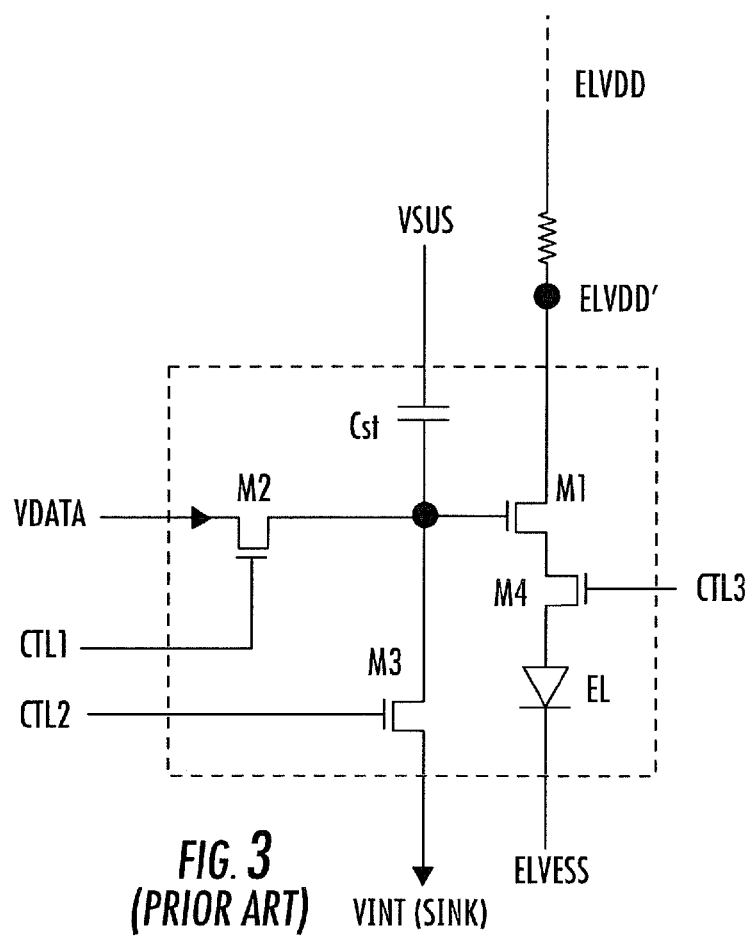
FIG. 3 is a schematic circuit diagram of a circuit of a pixel of a display device highlighting the resistance of the electrical path, according to the prior art.
Figure 2:
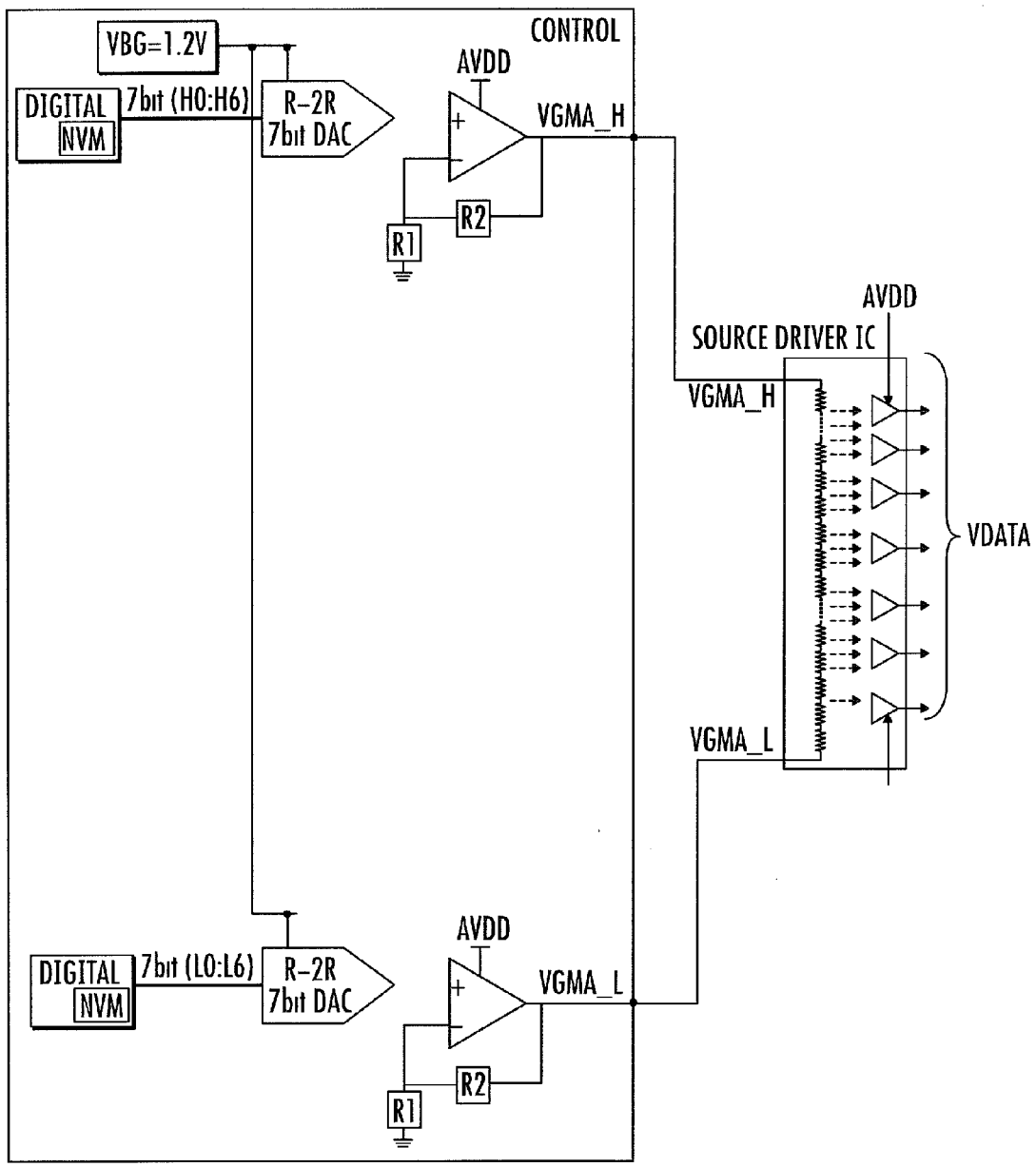
FIG. 2 is a schematic circuit diagram of a control circuit, according to the prior art.
Figure 4:
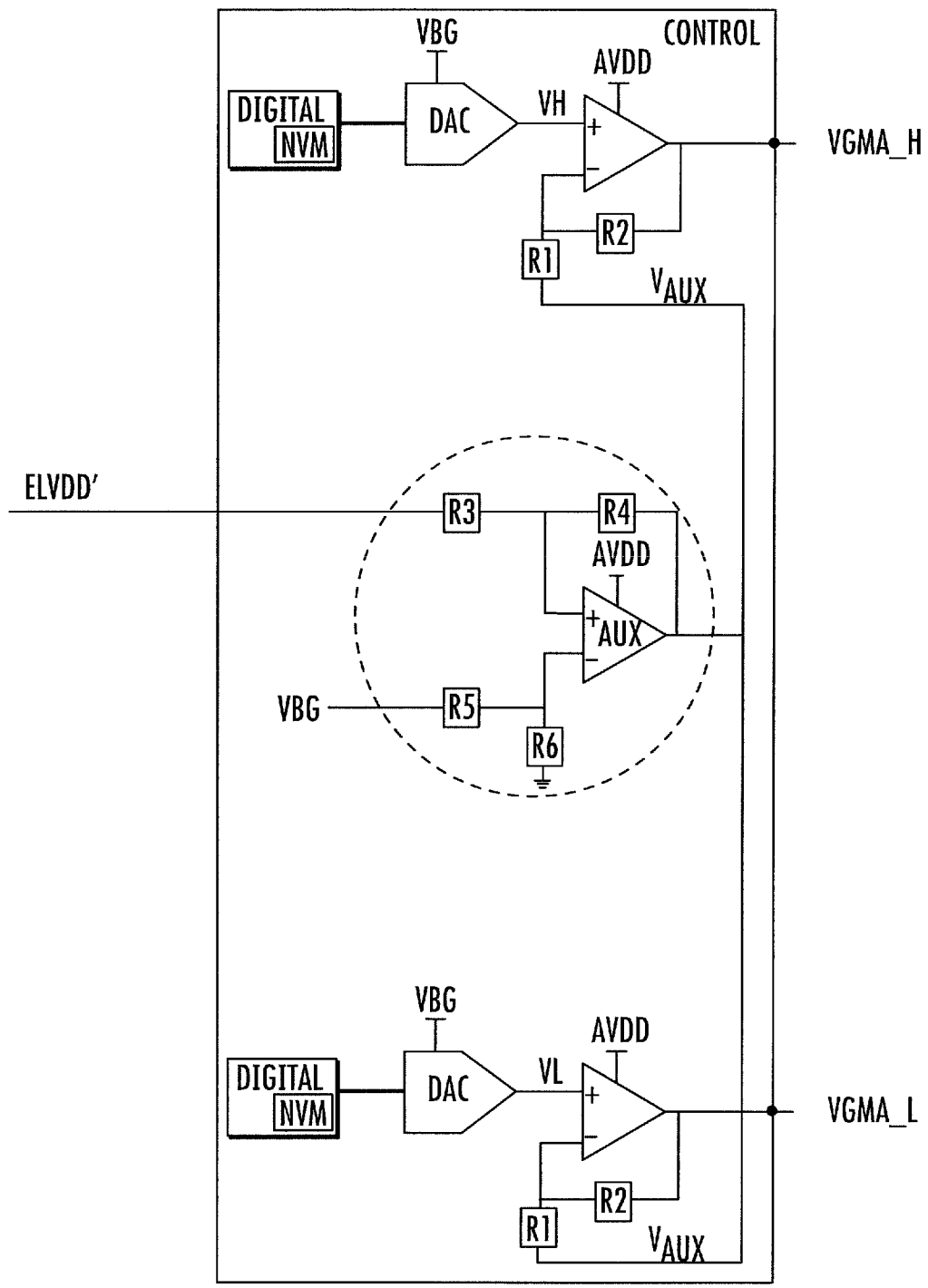
FIG. 4 is a schematic circuit diagram of a control circuit, according to the present disclosure.

In this description, reference will be made to the most common case in which the control circuit CONTROL receives digital words representing the nominal values of the extreme voltages VGMA_H and VGMA_L, though the method may be applied even if the control circuits is input with analog voltages VH and VL representing these nominal values. An embodiment of a control device CONTROL for generating corrected extreme values VGMA_H and VGMA_L between which the data voltages may range is depicted in FIG. 4. Differently from the typical control device of FIG. 2, it comprises an auxiliary amplifier AUX of the difference between the voltage ELVDD' effectively supplied to the electroluminescent components EL and a stable voltage, that in the shown example is the reference voltage VBG used for the digital-to-analog conversion. The auxiliary amplifier AUX generates an auxiliary voltage VAUX determined depending on the difference between a replica of the voltage ELVDD', eventually scaled, and the reference voltage Vref that is already available in the control circuit for carrying out the digital-to-analog conversion. The resistors R3, R4, R5 and R6 of the auxiliary amplifier AUX determine the input-output transfer characteristic of the amplifier and are preferably fixed such to generate a null (i.e. ground) auxiliary voltage VAUX when the voltage ELVDD' effectively supplied to the pixels equals its nominal value ELVDD. The amplifiers that generate the extreme voltages are coupled to the auxiliary voltage VAUX and not to the ground potential, as in the typical control device of FIG. 2.

In practice, the corrected extreme voltages VGMA_H and VGMA_L are given by the following equations:

$$VGMA\_H = R2/R1 * (VH - VAUX), \text{ and}$$

$$VGMA\_L = R2/R1 * (VL - VAUX).$$

Thus, they are adjusted depending on the auxiliary voltage VAUX to compensate for fluctuations of the voltage ELVDD' effectively supplied to the electroluminescent components EL. The amplitude of the interval VGMA_H-VGMA_L remains unchanged, thus fluctuations of the effectively supplied voltage ELVDD' are compensated without altering the desired range of variation of the data voltages VDATA.

In theory, it would be possible to partially compensate for the voltage drop on the supply path by knowing the position of the pixel in the array, but such an approach may require a relatively complex architecture to receive the information about the position and to manage it properly. By contrast, the illustrated architecture of the control circuit CONTROL is very simple and is capable of compensating accurately fluctuations of the voltage ELVDD' without requiring any information about the physical position of the pixel in the array, even if the addressed pixel is relatively far from the control circuit CONTROL. Indeed, the auxiliary amplifier absorbs a practically null current from the supply line that distributes the fixed voltage ELVDD, thus the sensed voltage input to the control circuit is practically identical to the voltage ELVDD' on the electroluminescent component EL, independently from the position thereof in the array of the display.

This approach may be readily implemented in integrated form and may require an extra pin of the control device CONTROL to sense the voltage ELVDD'. It should be noticed that eventual fluctuations of the fixed supply voltage ELVDD generated by the source are not compensated, as long as they do not cause variations of the effectively supplied voltage ELVDD'.

Figure 5:
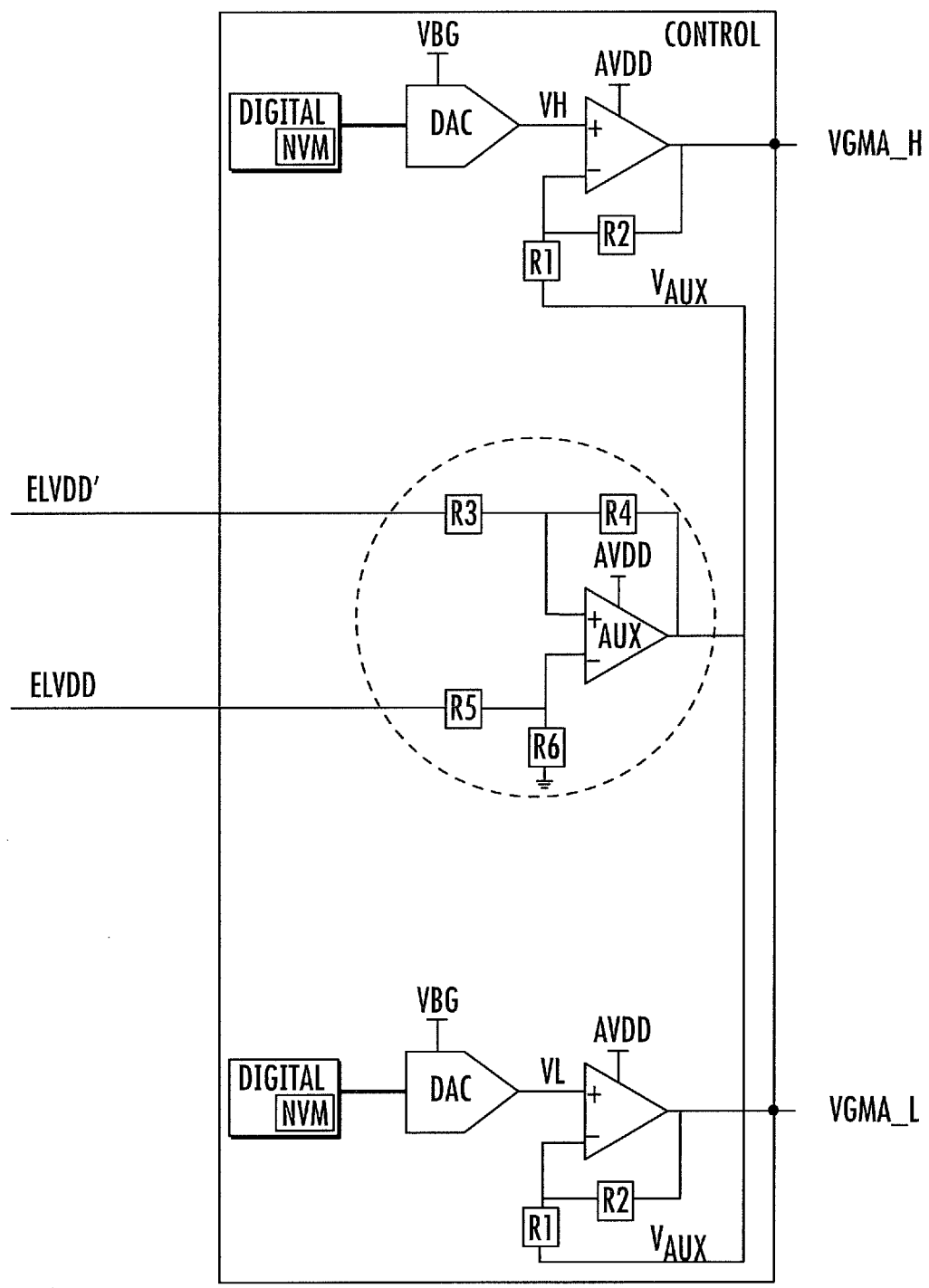
FIG. 5 is a schematic circuit diagram of another embodiment of a control circuit, according to the present disclosure.

If only the difference between the voltage ELVDD' and its nominal value ELVDD is to be compensated, it is possible to use the alternative embodiment of FIG. 5. The functioning of this alternative control device CONTROL is similar to that of FIG. 4, though the auxiliary amplifier is input with the voltage ELVDD instead of the reference voltage VBG. This alternative architecture needs two extra pins, for receiving the voltages ELVDD' and ELVDD, and compensates accurately for the voltage drop on the line that distributes the fixed supply voltage ELVDD.

It is presumed that any skilled person will be capable of designing the auxiliary amplifier such to have a bandwidth and a slew rate adapted for the disclosed application, and for this reason these design aspects are not discussed further. The compensation of the extreme voltages VGMA_H and VGMA_L may be done dynamically during image refresh operations. The architectures of control devices may be conveniently realized in integrated form and may be used for controlling electroluminescent displays, in particular, AMOLED displays.

That which is claimed is:

1. A control circuit for generating at least upper and lower voltages that define a range of a data voltage for controlling a driving transistor of an electroluminescent component, the control circuit comprising:
    a pair of amplifiers coupled together at a first input terminal and configured to generate the upper voltage and the lower voltage to correspond to a difference between a common voltage at the first input terminal and, respectively, first and second analog intermediate voltages representing respective threshold values of the upper voltage and of the lower voltage; and
    an auxiliary amplifier configured to
        adjust the upper voltage and the lower voltage based upon fluctuations of an input voltage, and
        generate the common voltage to correspond to the difference between the input voltage and a reference voltage.

2. The control circuit of claim 1 further comprising a second input terminal configured to receive the reference voltage.

3. The control circuit of claim 1 further comprising a plurality of resistors coupled to said auxiliary amplifier.

4. The control circuit of claim 1 further comprising a voltage generator configured to generate the reference voltage.

5. The control circuit of claim 4 further comprising a pair of digital-to-analog converters (DACs) configured to receive respective digital words representing the threshold values of the upper voltage and the lower voltage, and to generate the first and second analog intermediate voltages, said pair of DACs being coupled to said voltage generator to be supplied with the reference voltage.

6. A control circuit for generating upper and lower voltages for controlling an electroluminescent component, the control circuit comprising:
    a pair of amplifiers coupled together at a first input terminal and configured to generate the upper voltage and the lower voltage to correspond to a difference between a common voltage at the first input terminal and, respectively, threshold values of the upper voltage and of the lower voltage; and an auxiliary amplifier configured to
adjust the upper voltage and the lower voltage based upon fluctuations of an input voltage, and
generate the common voltage to correspond to the difference between the input voltage and a reference voltage.

7. The control circuit of claim 6 further comprising a plurality of resistors coupled to said auxiliary amplifier.

8. The control circuit of claim 6 further comprising a voltage generator configured to generate the reference voltage.

9. The control circuit of claim 8 further comprising a pair of digital-to-analog converters (DACs) configured to receive respective digital words representing the threshold values of the upper voltage and the lower voltage, and to generate first and second analog intermediate voltages, said pair of DACs being coupled to said voltage generator to be supplied with the reference voltage.

10. An electroluminescent display comprising:
an array of pixel circuits, each pixel circuit comprising
an electroluminescent component,
a driving transistor comprising a control terminal and configured to couple said electroluminescent component to a supply voltage, and
a switching transistor configured to couple the control terminal of said driving transistor to a data voltage;
a control circuit configured to generate upper voltage and lower voltages that define a range of the data voltage; and
a generator configured to
receive the upper voltage, the lower voltage, and a command representing a quantized level of the range, and
generate the data voltage to correspond to the quantized level;
said control circuit comprises
a pair of amplifiers coupled together at a first input terminal and configured to generate the upper voltage and the lower voltage to correspond to a difference between a common voltage at the first input terminal and, respectively, threshold values of the upper voltage and of the lower voltage; and
an auxiliary amplifier configured to
adjust the upper voltage and the lower voltage based upon fluctuations of an input voltage, and
generate the common voltage to correspond to the difference between the input voltage and a reference voltage.

11. The electroluminescent display of claim 10 wherein said control circuit further comprises a plurality of resistors coupled to said auxiliary amplifier.

12. The electroluminescent display of claim 10 wherein said control circuit further comprises a voltage generator configured to generate the reference voltage.

13. The electroluminescent display of claim 12 wherein said control circuit further comprises a pair of digital-to-analog converters (DACs) configured to receive respective digital words representing the threshold values of the upper voltage and the lower voltage, and to generate first and second analog intermediate voltages, said pair of DACs being coupled to said voltage generator to be supplied with the reference voltage.

14. An electroluminescent display comprising:
an array of pixel circuits, each pixel circuit comprising an electroluminescent component, and a driving transistor comprising a control terminal configured to receive a data voltage and configured to couple said electroluminescent component to a supply voltage;
a control circuit configured to generate upper voltage and lower voltages that define a range of the data voltage; and
said control circuit comprises
a pair of amplifiers coupled together at a first input terminal and configured to generate the upper voltage and the lower voltage to correspond to a difference between a common voltage at the first input terminal and, respectively, threshold values of the upper voltage and of the lower voltage; and
an auxiliary amplifier configured to
adjust the upper voltage and the lower voltage based upon fluctuations of an input voltage, and
generate the common voltage to correspond to the difference between the input voltage and a reference voltage.

15. The electroluminescent display of claim 14 wherein said control circuit further comprises a plurality of resistors coupled to said auxiliary amplifier.

16. The electroluminescent display of claim 14 wherein said control circuit further comprises a voltage generator configured to generate the reference voltage.

17. The electroluminescent display of claim 16 wherein said control circuit further comprises a pair of digital-to-analog converters (DACs) configured to receive respective digital words representing the threshold values of the upper voltage and the lower voltage, and to generate first and second analog intermediate voltages.

18. A method of controlling an electroluminescent display comprising an array of pixel circuits, each pixel circuit comprising an electroluminescent component, a driving transistor comprising a control terminal and configured to couple the electroluminescent component to a supply voltage, a switching transistor to couple the control terminal of the driving transistor to a data voltage, a control circuit to generate upper voltage and lower voltages that define a range of the data voltage, and a generator to receive the upper voltage, the lower voltage, and a command representing a quantized level of the range, and generate the data voltage to correspond to the quantized level, the method comprising:
generating the upper voltage and the lower voltage to correspond to a difference between a common voltage and, respectively, first and second analog voltages representing respective threshold values of the upper voltage and lower voltages; and
generating the common voltage to correspond to the difference between the voltage supplied to the driving transistor and a reference voltage.

19. The method of claim 18 wherein the reference voltage is a fixed voltage generated by the generator.

20. The method of claim 18 further comprising:
digital-to-analog converting digital words representing the first and second analog intermediate voltages; and
generating the reference voltage for the digital-to-analog converting.

21. A method of operating a control circuit for generating upper and lower voltages for controlling an electroluminescent component, the method comprising:
using a pair of amplifiers coupled together at a first input terminal to generate the upper voltage and the lower voltage to correspond to a difference between a common voltage and, respectively, threshold values of the upper voltage and of the lower voltage; and
using an auxiliary amplifier to adjust the upper voltage and the lower voltage based upon fluctuations of an input voltage, and generate the common voltage to correspond to the difference between the input voltage and a reference voltage.

22. The method of claim 21 further comprising receiving the reference voltage on a second input terminal.

23. The method of claim 21 further comprising a voltage generator configured to generate the reference voltage.

24. The method of claim 23 further comprising digital-to-analog converting respective digital words representing the threshold values of the upper voltage and the lower voltage to first and second analog intermediate voltages.

* * * * *